D. P. CUDD.
Earth-Auger.
No. 226,444. Patented April 13, 1880.
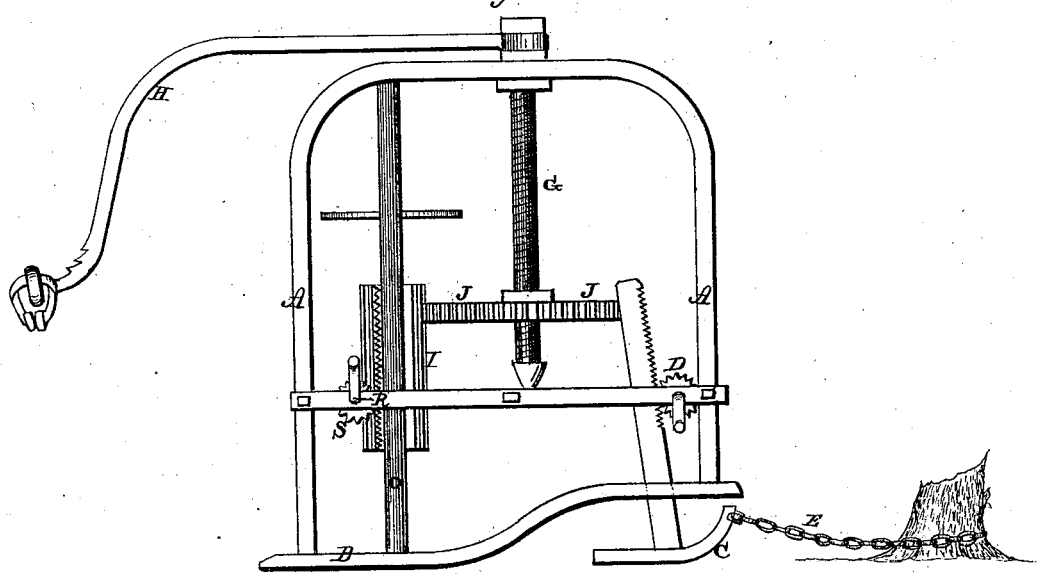
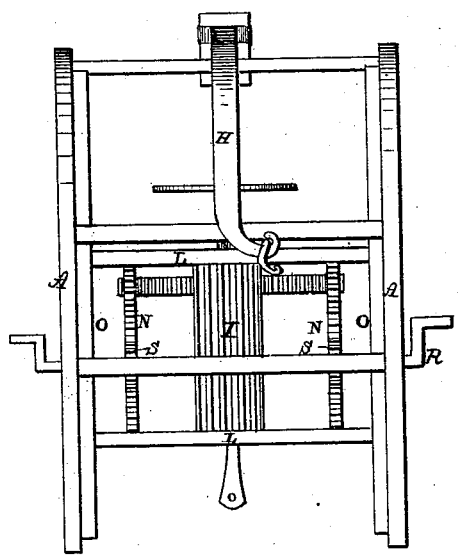
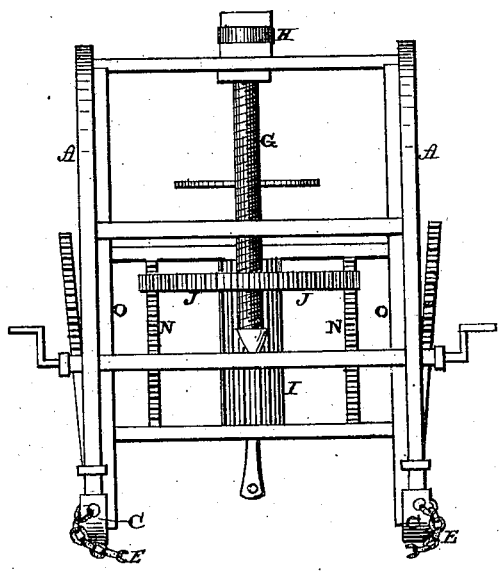
Witnesses:
Wm. W. Mortimer
Geo Quigley
Inventor:
D. P. Cudd
per
F. A. Lehmann,
Atty

United States Patent Office.

DECATER P. CUDD, OF CONCRETE, TEXAS.

EARTH-AUGER.

SPECIFICATION forming part of Letters Patent No. 226,444, dated April 13, 1880.

Application filed January 6, 1880.

*To all whom it may concern:*

Be it known that I, D. P. CUDD, of Concrete, in the county of De Witt and State of Texas, have invented certain new and useful Improvements in Machines for Boring Post-Holes and Wells; and I do hereby declare the following to be a full, clear, and exact description of the invention, such as will enable others skilled in the art to which it pertains to make and use it, reference being had to the accompanying drawings, which form part of this specification.

My invention relates to an improvement in machines for boring post-holes and wells; and it consists in two long bent sills which have two of their ends curved upward and provided with openings through which the shanks of the feet pass, the said shanks being provided with teeth to mesh with a pinion by which the feet are raised and lowered, as will be more fully described hereinafter.

Figure 1 is a side elevation of my invention. Figs. 2 and 3 are end views of the same.

A represents a suitable iron or wooden frame of any desired shape, form, or construction. The lower sills or bottom pieces, B, of this frame only rest upon the ground for a short distance at one end, and their front ends are raised upward, as shown, so as not to come in contact with the earth.

The front corners of the machine are supported wholly upon the two feet C, which are shaped like sled-runners, and which have teeth made in one of the edges of their shanks, to engage with the pinions D, by means of which the feet can be adjusted up and down at will.

By raising the feet up as high as they can be made to go the front end of the machine will be tilted downward, and then the hole for the post or well will be dug at an angle instead of vertically.

Where the hole is to be bored on the side of a hill or on uneven ground this adjustment is very necessary, or the holes could not be bored straight. Attached to the front end of these feet or runners is the chain E, by means of which the machine can be drawn from one place to another.

Journaled in two of the cross-bars in the frame is the vertical shaft G, which has the sweep H secured to its upper end, and to which sweep a horse or other animal is to be attached for the purpose of doing the whole boring by animal-power. On the lower end of this shaft is secured the large driving-wheel J, which meshes with and operates the long pinion I, which is journaled in a vertically-adjustable frame, L. This frame is provided with racks or teeth N, and moves up and down in the two guides O, which are secured to the inside of the frame, as shown.

Passing through the frame is a cranked shaft, R, which is provided with the pinions S, and which pinions move the frame vertically for the purpose of raising the auger from the ground and lowering it again whenever it is desired to start it into operation. After the auger has once taken hold of the earth this frame feeds itself down; but where a heavy drill-bar is attached to the lower end of the shaft to which the pinion is secured the frame will adjust itself in the same manner.

By thus having a horse or other animal to operate the auger holes can be drilled with great rapidity.

Having thus described my invention, I claim—

A machine for boring post-holes having its base formed of the two long bent sills B, having holes through them at one end, in combination with the feet C, shaped as shown, and provided with shanks which pass up through the sills and have teeth for engaging with the pinions D, substantially as shown and described.

In testimony that I claim the foregoing I have hereunto set my hand this 22d day of December, 1879.

DECATER P. CUDD.

Witnesses:
J. P. BAKER,
J. E. CARR.